United States Patent
Hu

(10) Patent No.: US 11,402,062 B2
(45) Date of Patent: Aug. 2, 2022

(54) INSTALLABLE AND DISMANTLABLE APPARATUS

(71) Applicant: INNOVATIVE AUDIO INTERNATIONAL CO., LTD., Huizhou (CN)

(72) Inventor: Jack Hu, Huizhou (CN)

(73) Assignee: INNOVATIVE AUDIO INTERNATIONAL CO., LTD., Huizhou (CN)

( * ) Notice: Subject to any disclaimer, the term of this patent is extended or adjusted under 35 U.S.C. 154(b) by 0 days.

(21) Appl. No.: 16/939,377

(22) Filed: Jul. 27, 2020

(65) Prior Publication Data

US 2021/0341100 A1     Nov. 4, 2021

(51) Int. Cl.
*F16M 13/02*     (2006.01)

(52) U.S. Cl.
CPC ....... *F16M 13/027* (2013.01); *F16M 2200/02* (2013.01); *F16M 2200/08* (2013.01)

(58) Field of Classification Search
CPC ............ F16M 13/027; F16M 2200/02; F16M 2200/08; F21V 21/04; F21V 21/042; F21V 21/043; F21V 21/046; F21V 21/047; E04B 9/006; H04R 1/025; H04R 2201/021; H04R 1/02; F04R 1/026
USPC .................................................. 248/346.03
See application file for complete search history.

(56) References Cited

U.S. PATENT DOCUMENTS

| | | | |
|---|---|---|---|
| 8,023,664 B2 * | 9/2011 | Yang | H04R 1/025 |
| | | | 181/150 |
| 9,084,046 B2 * | 7/2015 | Ivey | H04R 1/025 |
| 9,479,852 B2 * | 10/2016 | Yang | H04R 1/025 |
| 10,820,081 B1 * | 10/2020 | Belliston | H04R 1/026 |
| 11,064,275 B2 * | 7/2021 | Mai | F16B 2/10 |
| 2009/0324004 A1 * | 12/2009 | Yang | H04R 1/025 |
| | | | 381/395 |
| 2010/0155556 A1 * | 6/2010 | Nelson | H04R 1/025 |
| | | | 248/231.51 |
| 2011/0017889 A1 * | 1/2011 | Nelson | B60R 11/0217 |
| | | | 248/229.23 |
| 2014/0305734 A1 * | 10/2014 | Ivey | H04R 1/025 |
| | | | 181/150 |
| 2015/0271578 A1 * | 9/2015 | Marcum | H04R 1/02 |
| | | | 381/395 |
| 2016/0241940 A1 * | 8/2016 | Yang | H04R 1/026 |
| 2016/0366501 A1 * | 12/2016 | Ivey | H04R 1/025 |

(Continued)

*Primary Examiner* — Christopher Garft
(74) *Attorney, Agent, or Firm* — WPAT, PC

(57) ABSTRACT

An installable and dismantlable apparatus as provided by the present invention includes: a load bearing part; a fixing mechanism including an unlocking drive component and a fixing moving component, the unlocking drive component disposed on the load bearing part, and the fixing moving component connected with the unlocking drive component; and a transmission mechanism including a first stage transmission component and a second stage transmission component, the first stage transmission component located on the load bearing part, the second stage transmission component connected with the unlocking drive component, and the first stage transmission component connected with the second stage transmission component. The present invention not only realizes quick installation and dismantling, and improves the efficiency, but also saves manpower and time, and reduces cost.

9 Claims, 7 Drawing Sheets

(56) References Cited

U.S. PATENT DOCUMENTS

| | | | |
|---|---|---|---|
| 2018/0054665 A1* | 2/2018 | Ivey | H04R 1/345 |
| 2019/0226637 A1* | 7/2019 | Mai | F24F 7/007 |
| 2019/0301668 A1* | 10/2019 | Mai | F16B 2/18 |
| 2020/0049308 A1* | 2/2020 | Mai | F21V 21/03 |
| 2021/0076515 A1* | 3/2021 | Mai | H05K 5/0204 |

* cited by examiner

INSTALLABLE AND DISMANTLABLE APPARATUS

FIELD OF THE DISCLOSURE

The disclosure relates to the field of mechanical structure technologies, and more particularly to an installable and dismantlable apparatus.

BACKGROUND

In real life, no matter in home, offices or outside shops, devices such as panel lamps, fans, sounds and the like can be arranged on the ceiling everywhere, and the devices are traditionally fixed by bolts, screws or welding directly. However, no matter in either fixing method, it is inconvenient to install and disassemble, and takes a lot of manpower and time.

SUMMARY

In view of deficiencies in the prior art, the disclosure provides an installable and dismantlable apparatus.

An installable and dismantlable apparatus as disclosed in the disclosure includes: a load bearing part, a fixing mechanism, and a transmission mechanism. The fixing mechanism includes an unlocking drive component and a fixing moving component, the unlocking drive component is disposed on the load bearing part, the fixing moving component is connected with the unlocking drive component, and the unlocking drive component is configured for driving the fixing moving component to move for fixing. The transmission mechanism includes a first stage transmission component and a second stage transmission component, the first stage transmission component is disposed on the load bearing part, the second stage transmission component is connected with the unlocking drive component, the first stage transmission component is connected with the second stage transmission component, and the first stage transmission component is configured for driving the unlocking drive component to move for unlocking by the second stage transmission component.

According to an embodiment of the disclosure, the load bearing part is provided with a supporting column, and the supporting column is connected with the unlocking drive component.

According to an embodiment of the disclosure, the load bearing part is further provided with a guide rail, and the fixing moving component is disposed in the guide rail.

According to an embodiment of the disclosure, the unlocking drive component includes a supporting part, an unlocking part, an elastic part and an unlocking drive part; the supporting part is disposed on the supporting part, the unlocking part is slidably disposed on the supporting part, and the unlocking part is connected with the second stage transmission component; the unlocking drive part is connected with the supporting part through the elastic part, and the unlocking drive part is connected with the fixing moving component.

According to an embodiment of the disclosure, the supporting part is provided with a first guide pillar and a second guide pillar, the first guide pillar is slidably connected with the second stage transmission component, and the second guide pillar is slidably connected with the unlocking part.

According to an embodiment of the disclosure, the unlocking drive part is provided with an engagement slot, and the unlocking part is disposed in the engagement slot.

According to an embodiment of the disclosure, the fixing moving component includes a moving part and a fixed part, the moving part is connected with the unlocking drive part, and the moving part is configured for driving the fixed part to move and fixed by the fixed part.

According to an embodiment of the disclosure, the moving part is provided with a guide groove, and the unlocking drive part is disposed in the guide groove.

According to an embodiment of the disclosure, the first stage transmission component includes a first stage transmission part and a first stage push part, the first stage transmission part is movably disposed on the load bearing part, and the first stage push part is disposed on the first stage transmission part.

According to an embodiment of the disclosure, the second stage transmission component includes a second stage transmission part and a second stage push part, the second stage transmission part is slidably disposed on the unlocking drive component, the second stage push part is disposed on the second stage transmission part, and the second stage push part abuts against the first stage push part.

The beneficial effect of the disclosure is that, during installation process, the first stage transmission component acts on the second stage transmission component, and then the second stage transmission component acts on the unlocking drive component, so that the fixing moving component is driven to move for fixing. When during disassembling process, only the fixing moving component needs to be pushed reversely. The present invention not only ensures the fixed effect, but also saves a lot of manpower, time and cost.

BRIEF DESCRIPTION OF THE DRAWINGS

Drawings in the description below are used to provide a further understanding of the disclosure, and are a part of the disclosure. The exemplary embodiments of the disclosure and the description thereof are used to explain the disclosure and do not constitute an improper limitation of the disclosure. In the drawings.

LABELS DESCRIPTION IN THE DRAWINGS

1—load bearing part; 11—supporting column; 12—guide rail; 13—position avoiding opening;

2—fixing mechanism; 21—unlocking drive component; 211—supporting part; 2111—first guide pillar; 2112—second guide pillar; 212—unlocking part; 2121—second inclined plane; 213—elastic part; 214—unlocking drive part; 2141—engagement slot; 2142—first inclined plane; 22—fixing moving component; 221—moving part; 2211—guide groove; 222—fixed part; 2221—clamping block;

3—transmission mechanism; 31—first stage transmission component; 311—first stage transmission part; 312—first stage push part; 3121—third inclined plane; 32—second stage transmission component; 321—second stage transmission part; 322—second stage push part; 3221 fourth inclined plane;

4—sound equipment.

DETAILED DESCRIPTION OF EMBODIMENTS

Several embodiments of the disclosure will be disclosed with schema below. For clarity, many practical details will be described in the following description. However, it should be understood that these practical details should not be applied to limit the disclosure. That is, in some embodiments of the disclosure, these practical details are unnecessary. In addition, in order to simplify the schema, some familiar structures and components will be shown in a simple schematic way in the schema.

In addition, the descriptions of "first", "second" and so on in the disclosure are only used for description purpose, not specifically referring to the meaning of sequence or order, nor to define the disclosure. There are only for distinguishing components or operations described in the same technical terms, but not for indicating or implying the relative importance or implying the number of indicated technical features. Thus, a feature defined with "first" or "second" may include at least one such feature, either explicitly or implicitly. Additionally, the technical solutions among the embodiments can be combined with each other, but it must be based on the realization of ordinary skilled person in the art. When the combination of the technical solutions is contradictory or cannot be realized, it should be considered that the combination of the technical solutions does not exist, nor is it within the scope of protection required by the disclosure.

Figure 1:
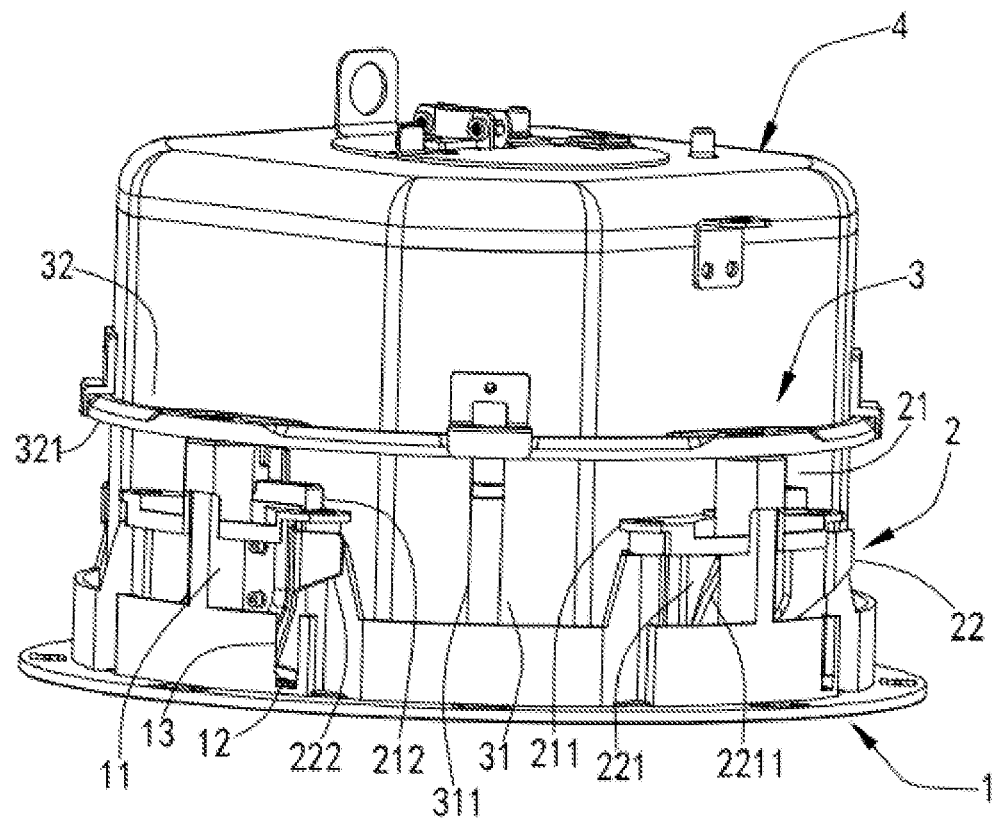
FIG. 1 is a perspective schematic structural view of an installable and dismantlable apparatus according to an embodiment.

As shown in FIG. 1, FIG. 1 is a perspective schematic structural view of an installable and dismantlable apparatus in the embodiment. In this embodiment, it will be explained with the combination of the ceiling equipment as an example, for example, a light or a sound equipment 4 on the ceiling, specifically, the installable and dismantlable apparatus combined with a sound equipment 4 on the ceiling are taken as an example. The installable and dismantlable apparatus of the disclosure includes a load bearing part 1, a fixing mechanism 2 and a transmission mechanism 3. The fixing mechanism 2 includes an unlocking drive component 21 and a fixing moving component 22. The unlocking drive component 21 is disposed on the load bearing part 1, the fixing moving component 22 is connected with the unlocking drive component 21, and the fixing moving component 22 can move relatively to the load bearing part 1. The transmission mechanism 3 includes a first stage transmission component 31 and a second stage transmission component 32. The first stage transmission component 31 is disposed on the load bearing part 1, and the second stage transmission component 32 is connected with the unlocking drive component 21, while the second stage transmission component 32 is further connected with the first stage transmission component 31.

For specific applications, the sound equipment 4 is disposed on the load bearing part 1. Specifically, the sound equipment 4 is surrounded by the load bearing part 1.

When the installable and dismantlable apparatus is installed and used, the first stage transmission component 31 is driven by external force, the first stage transmission component 31 moves relative to the load-load bearing part 1, and the first stage transmission component 31 drives the second stage transmission component 32 to move, the second stage transmission component 32 drives the unlocking drive component 21 to move, the unlocking drive component 21 unlocks and drives the fixing moving component 22 to move, and finally the installable and dismantlable apparatus is fixed through the fixing moving component 22. When the installable and dismantlable apparatus needs to be dismantled, it is only necessary to push the unlocking drive component 21 to return to its initial position by an external force, and the fixing moving component 22 is driven by the unlocking drive component 21 to return to the initial position together so as to realize unlocking.

Figure 2:
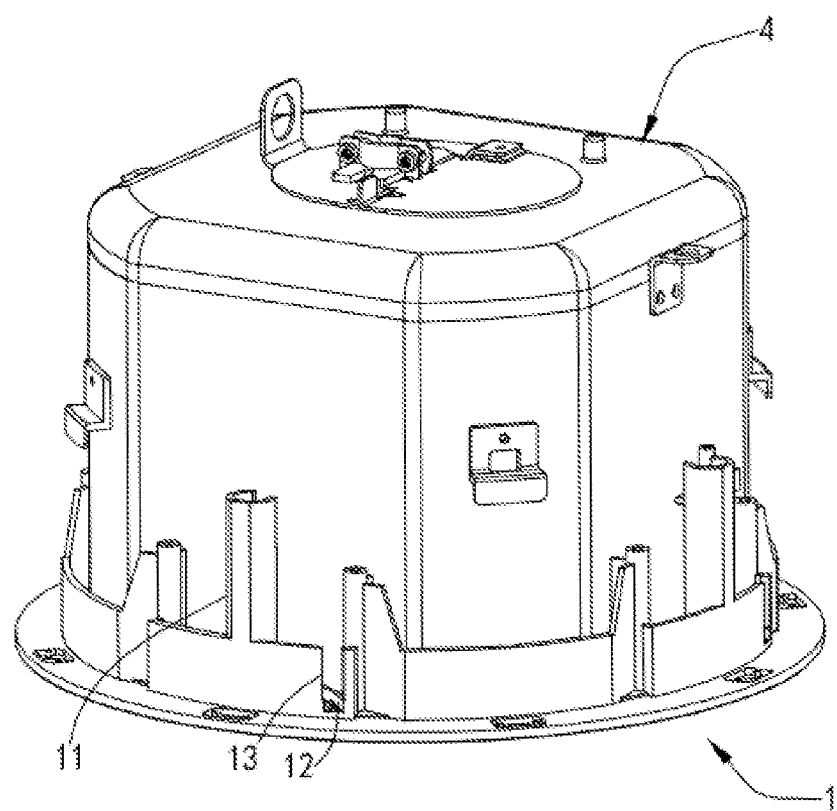
FIG. 2 is a perspective schematic structural view of a load bearing part according to an embodiment.
Figure 3:
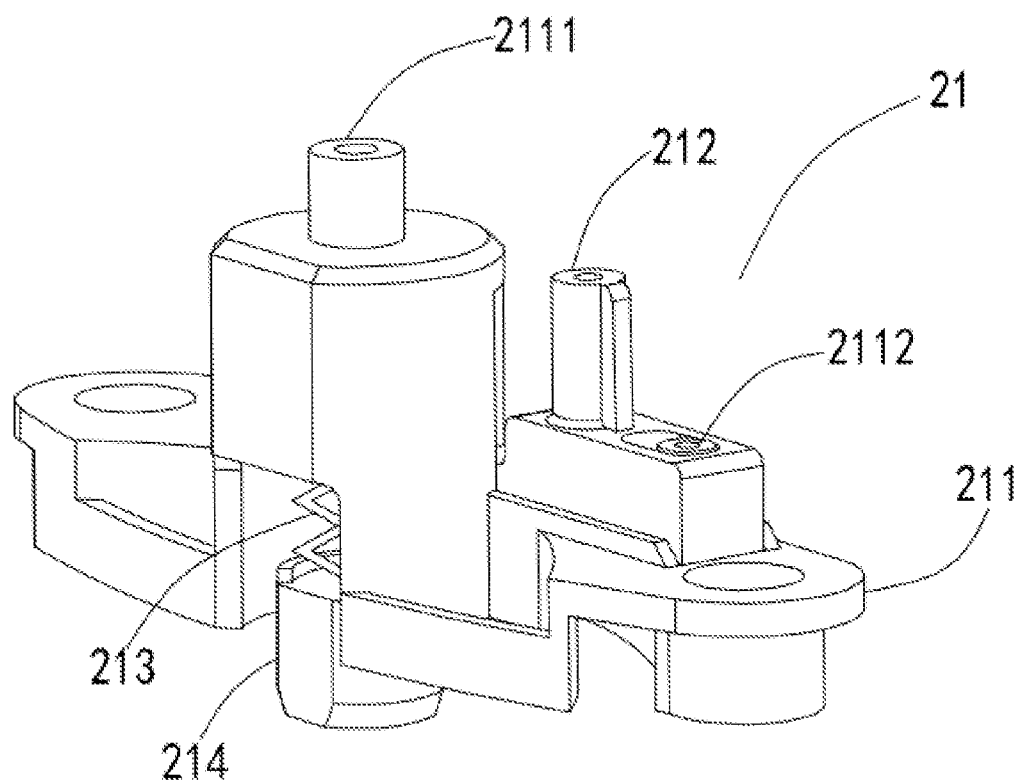
FIG. 3 is a perspective schematic structural view of an unlocking drive component according to an embodiment.

Referring to FIG. 2, FIG. 2 is a perspective schematic structural view of the load bearing part 1 in the embodiment. Preferably, the load bearing part 1 is provided with a supporting column 11 which is connected with the unlocking drive component 21. In specific applications, there are three supporting columns 11, and the three supporting columns 11 are arranged as one group, and the three supporting columns 11 respectively act on ends and middle of the unlocking drive component 21. Two supporting columns 11 at the ends and the unlocking drive component 21 are fixed by bolts, and the middle supporting column 11 is of a hollow structure. When it needs to be dismantled, the hollow structure of the middle supporting column 11 acts on the transmission component 21 by an external structural part, thereby the dismantling of the overall installable and dismantlable apparatus is realized. It needs to be noted that the external structural part can be a pole matching the hollow structure of the middle supporting column 11. Of course, the external structural part is not limited to the pole, it also can be another object(s).

Preferably, the load bearing part 1 is further provided with a guide rail 12, and the fixing moving component 22 is disposed in the guide rail 12. In specific applications, the guide rail 12 is set in an arc shape, which saves more space and reduces the occupied area of the installable and dismantlable apparatus compared with that of a straight-line guide rail.

It should be noted that at least two groups of supporting columns 11 and two guide rails 12 are set on the load bearing part 1, so as to enhance the stability and fixation effect of the installable and dismantlable apparatus. In this embodiment, four groups of supporting columns 11 and four guide rails 12 are taken as example to illustrate. Four groups of supporting columns 11 and four guide rails 12 are respectively located on four sides of the load bearing part 1, one group of supporting columns 11 is matched with one guide rail 12; correspondingly, four unlocking drive components 21 and four fixing moving components 22 are also provided.

Figure 4:
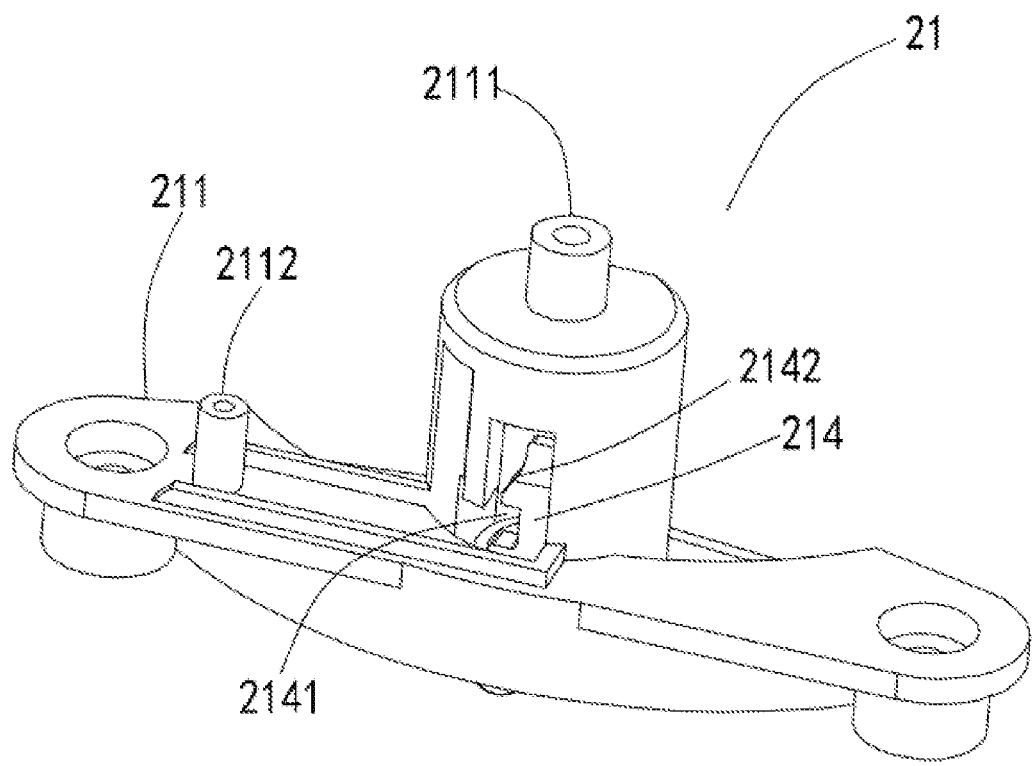
FIG. 4 is another perspective schematic structural view of the unlocking drive component according to the embodiment.
Figure 5:
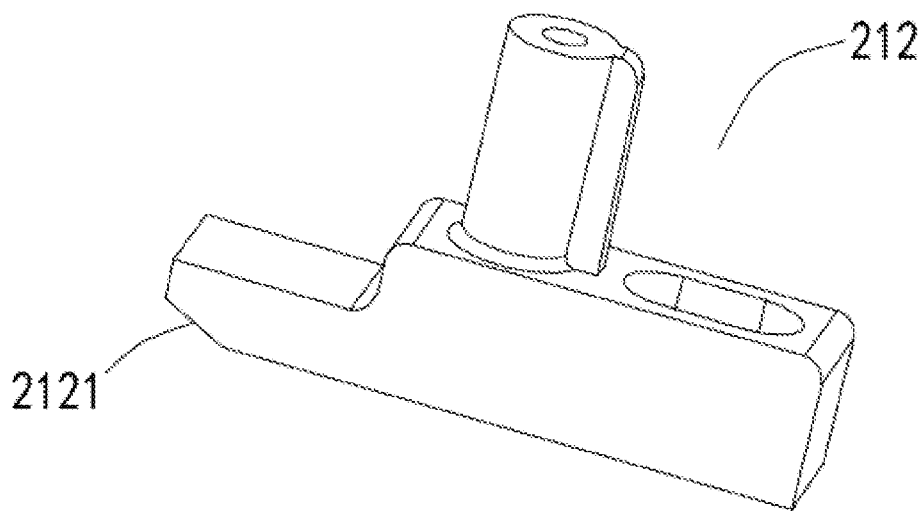
FIG. 5 is a perspective schematic structural view of an unlocking part according to an embodiment.
Figure 6:
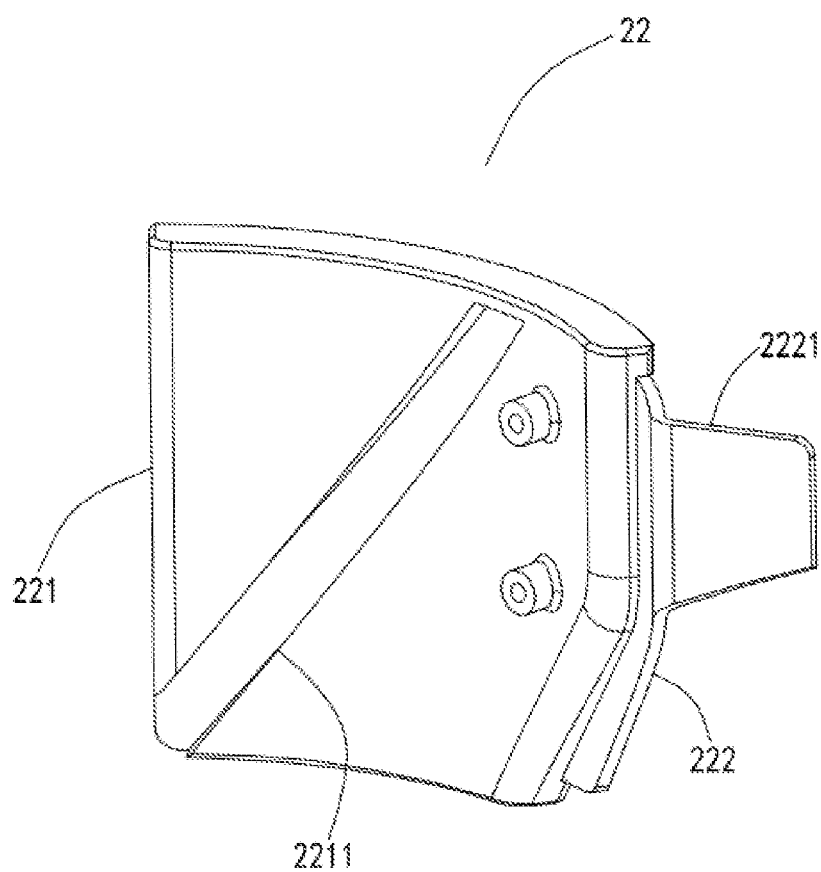
FIG. 6 is a perspective schematic structural view of a fixing moving component according to an embodiment.

Referring to FIGS. 3-6, FIG. 3 is a perspective schematic structural view of the unlocking drive component 21 in the embodiment; FIG. 4 is another perspective schematic structural view of the unlocking drive component 21 in the embodiment; FIG. 5 is a perspective schematic structure view of the unlocking part 212 in the embodiment; FIG. 6 is a perspective schematic structure view of a fixing moving component 22 in the embodiment. Preferably, the unlocking drive component 21 includes a supporting part 211, an unlocking part 212, an elastic part 213 and an unlocking drive part 214. The supporting part 211 is disposed on the load bearing part 1, the unlocking part 212 is slidably disposed on the supporting part 211, and the unlocking part 212 is connected with the second stage transmission component 32, the unlocking drive part 214 is connected with the supporting part 211 through the elastic part 213, and the unlocking drive part 214 is connected with the fixing moving component 22. In specific applications, two ends of the supporting part 211 are fixedly connected with two supporting columns 11, the middle of the supporting part 211 and the middle supporting column 11 on the load bearing part 1 form a cavity together, the elastic part 213 and the unlocking drive part 214 are both located in the cavity, and the unlocking drive part 214 can move in the cavity. Further preferably, the supporting part 211 is provided with a first guide pillar 2111 and a second guide pillar 2112, the second stage transmission component 32 is movably disposed on the first guide pillar 2111, and the unlocking part 212 is movably disposed on the second guide pillar 2112. Through the first guide pillar 2111 and the second guide pillar 2112, the movements of the second stage transmission component 32 and the unlocking part 212 can be limited respectively, and so as to make the movements of the two more accurate.

Preferably, the unlocking drive part 214 is provided with an engagement slot 2141, one end of the unlocking part 212 is disposed in the engagement slot 2141, and the unlocking drive part 214 is fixed through the unlocking part 212. In specific applications, one side of the unlocking drive 214 is provided with a first inclined plane 2142, and the unlocking drive 212 is provided with a second inclined plane 2121, the first inclined plane 2142 is matched with the second inclined plane 2121. When dismantling, the unlocking drive 214 moves towards the direction close to the unlocking drive 212, the first inclined plane 2142 abuts against the second inclined plane 2121, and the first inclined plane 2142 pushes the unlocking part 212 to move towards an away direction. After the first inclined plane 2142 is separated from the second inclined plane 2121, with the action of the spring inside of the unlocking part 212 (not labeled in figures), the unlocking part 212 returns to its initial position. At this time, the end of the unlocking part 212 is inserted into the engagement slot 2141, and then the unlocking drive part 214 is fixed.

Specifically, the elastic part 213 is a spring.

Preferably, the fixing moving component 22 includes a moving part 221 and a fixed part 222, the moving part 221 is disposed in the guide rail 12, and the moving part 221 can slide in the guide rail 12, the moving part 221 is also connected with the unlocking drive part 214, the fixed part 222 is disposed on the moving part 221, the unlocking drive part 214 drives the moving part 221 to move along the guide rail 12, and the moving part 221 drives the fixed part 222 to move. In specific applications, the moving part 221 is matched with the guide rail 12, so the overall shape of the moving part 221 is also arc-shaped, and the fixed part 222 is matched with the moving part 221, so the fixed part 222 is also arc-shaped. Further preferably, the moving part 221 is provided with a guide groove 2211, the unlocking driving part 214 is disposed in the guide groove 2211, and the unlocking driving part 214 moves slidably in the guide groove 2211, and the unlocking driving part 214 drives the moving part 221 to move through the guide groove 2211. The fixed part 222 is provided with a clamping block 2221, correspondingly, the load bearing part 1 is provided with a position avoiding opening 13, and the clamping block 2221 is matched with the position avoiding opening 13. Through the setting of the clamping block 2221, the installable and dismantlable apparatus is fixed for avoiding falling.

Figure 7:
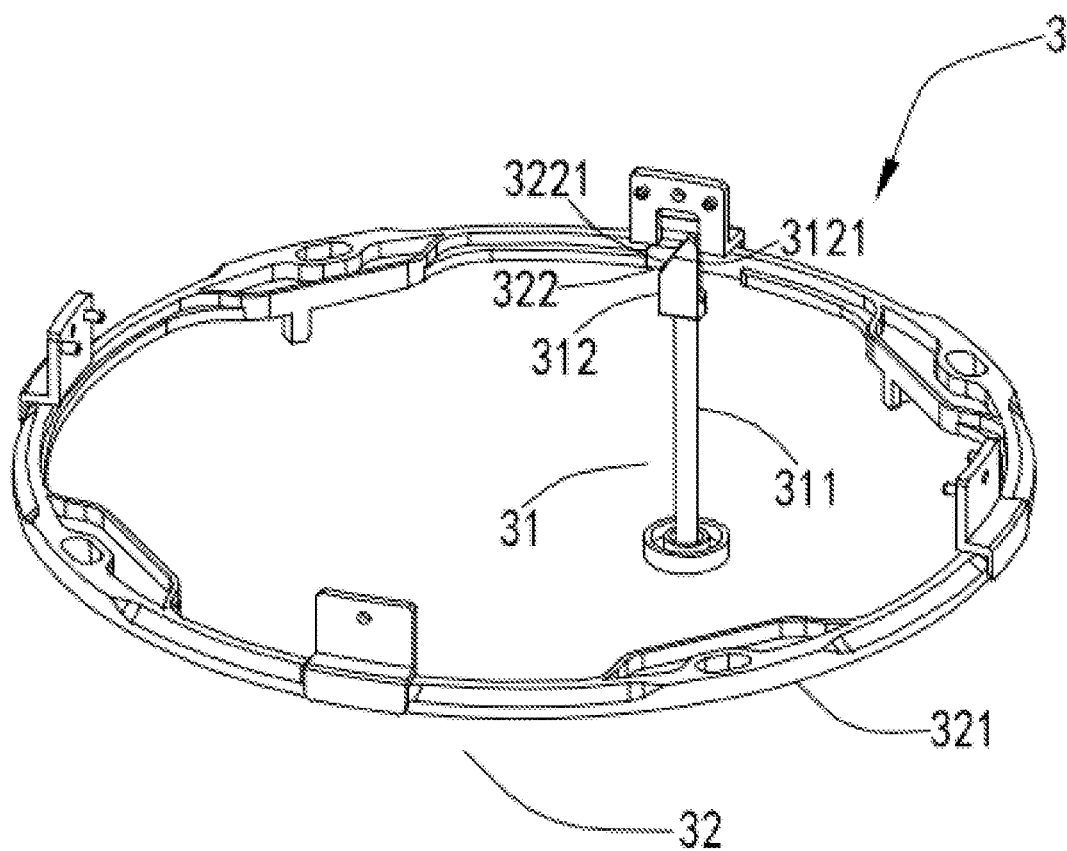
FIG. 7 is a perspective schematic structural view of a transmission mechanism according to an embodiment.

Referring to FIG. 7, FIG. 7 is a perspective schematic structural view of the transmission mechanism 3 in the embodiment. Preferably, the first stage transmission component 31 includes a first stage transmission part 311 and a first stage push part 312, the first stage transmission part 311 is movably disposed on the load bearing part 1, and the first stage push part 312 is disposed on the first stage transmission part 311. The second stage transmission component 32 includes a second stage transmission part 321 and a second stage push part 322. The second stage transmission part 321 is slidably disposed on the first guide pillar 2111, and the second stage push part 322 abuts against the first stage push part 312. In specific applications, the first stage driving part 312 is provided with a third inclined plane 3121, the second stage push part 322 is provided with a fourth inclined plane 3221, the third inclined plane 3121 is matched with the fourth inclined plane 3221, the first stage driving part 311 moves and drives the third inclined plane 3121, the third inclined plane 3121 acts on the fourth inclined plane 3221, and the second stage driving part 321 is driven to move through the fourth inclined plane 3221. Specifically, since the number of the first guide pillar 2111 is four, the second stage transmission part 321 is connected with four first guide pillars 2111 at the same time. In order to maintain stability after connection, the shape of the cross section of the second stage transmission part 321 is a ring.

When the installable and dismantlable apparatus is installing, the user pushes the first stage transmission part 311 to move through an external force, the first stage transmission part 311 pushes the second stage push part 322 to move through the first stage push part 312, the second stage push part 322 drives the second stage transmission part 321 to rotate, and the second stage transmission part 321 pushes the unlocking part 212 when it rotates. At this time, the spring inside the unlocking part 212 is in a stretching state, and the unlocking part 212 is separated from the engagement slot 2141. Since the initial state of the elastic part 213 is in a compression state, when the unlocking part 212 is separated from the engagement slot 2141, under the elastic force of the elastic part 213, the unlocking drive part 214 moves towards the direction away from the supporting part 211, the unlocking part 212 recovers to the initial position under the force of the spring, the unlocking drive part 214 drives the moving part 221 to move along the guide rail 12, and the moving part 221 moves together with the fixed part 222. The clamping block 2221 on the fixed part 222 is finally located in the position avoiding opening 13, and abuts against the ceiling so as to realize fixation.

When the installable and dismantlable apparatus is dismantling, the unlocking drive part 214 is pushed to its initial position by an external force. At the same time, the moving part 221 and the fixed part 222 also move to the initial position. The first inclined plane 2142 abuts against the second inclined plane 2121. With the continuous moving of unlocking drive part 214, the first inclined plane 2142 drives the unlocking part 212 to move towards an away direction through the second inclined plane 2121. After the inclined plane 2142 is separated from the second inclined plane 2121, under the force of the spring, the unlocking part 212 moves towards the initial position, and finally inserts into the engagement slot 2141, and thereby the unlocking drive part 214 is fixed. At this point, the whole installable and dismantlable apparatus can be taken out and the dismantling work is completed.

In summary, through the use together of the load bearing part, the fixing mechanism and the transmission mechanism, while installing, the first stage transmission component acts on the second stage transmission component, and then the second stage transmission component acts on the unlocking drive component, so as to drive the fixing moving component move, and finally realize the fixation through the fixing moving component; while dismantling, only the fixing moving component needs to be pushed in the reverse direction and the dismantling work is completed. This method not only realizes the quick installation and dismantling, and improves the efficiency, but also saves a lot of manpower and time in the process, and reduces cost.

The above description is only embodiments of the disclosure and is not used to limit the disclosure. For those skilled in the art, the disclosure may have various changes and variations. Any modification, equivalent replacement, improvement, etc. made in the spirit and principle of the disclosure shall be included in the claims of the disclosure.

What is claimed is:

1. An installable and dismantlable apparatus comprising:
a load bearing part (1);
a fixing mechanism (2), comprising an unlocking drive component (21) and a fixing moving component (22), wherein the unlocking drive component (21) is disposed on the load bearing part (1), the fixing moving component (22) is connected with the unlocking drive component (21), and the unlocking drive component (21) is configured for driving the fixing moving component (22) to move for fixing; and
a transmission mechanism (3), comprising a first stage transmission component (31) and a second stage transmission component (32), wherein the first stage transmission component (31) is disposed on the load bearing part (1), the second stage transmission component (32) is connected with the unlocking drive component (21), the first stage transmission component (31) is connected with the second stage transmission component (32), and the first stage transmission component (31) is configured for driving the unlocking drive component (21) to move for unlocking by the second stage transmission component (32);
wherein the unlocking drive component (21) comprises a supporting part (211), an unlocking part (212), an elastic part (213) and an unlocking drive part (214); the supporting part (211) is disposed on the supporting part (1), the unlocking part (212) is slidably disposed on the supporting part (211), and the unlocking part (212) is connected with the second transmission component (32); the unlocking drive part (214) is connected with the supporting part (211) through the elastic part (213), and the unlocking drive part (214) is connected with the fixing moving component (22).

2. The installable and dismantlable apparatus as claimed in claim 1, wherein the load bearing part (1) is provided with a supporting column (11), and the supporting column (11) is connected with the unlocking drive component (21).

3. The installable and dismantlable apparatus as claimed in claim 1, wherein the load bearing part (1) is provided with a guide rail (12), and the fixing moving component (22) is disposed in the guide rail (12).

4. The installable and dismantlable apparatus as claimed in claim 1, wherein that the supporting part (211) is provided with a first guide pillar (2111) and a second guide pillar (2112), the first guide pillar (2111) is slidably connected with the second stage transmission component (32), and the second guide pillar (2112) is slidably connected with the unlocking part (212).

5. The installable and dismantlable apparatus as claimed in claim 1, wherein the unlocking drive part (214) is provided with an engagement slot (2141), and the unlocking part (212) is disposed in the engagement slot (2141).

6. The installable and dismantlable apparatus as claimed in claim 1, wherein the fixing moving component (22) comprises a moving part (221) and a fixed part (222), the moving part (221) is connected with the unlocking drive part (214), the fixed part (222) is connected with the moving part (221), and the moving part (221) is configured for driving the fixed part (222) to move and fixed by the fixed part (222).

7. The installable and dismantlable apparatus as claimed in claim 6, wherein the moving part (221) is provided with a guide groove (2211), and the unlocking drive part (214) is disposed in the guide groove (2211).

8. The installable and dismantlable apparatus as claimed in claim 1, wherein the first stage transmission component (31) comprises a first stage transmission part (311) and a first stage push part (312), the first stage transmission part (311) is movably disposed on the load bearing part (1), and the first stage push part (312) is disposed on the first stage transmission part (311).

9. The installable and dismantlable apparatus as claimed in claim 8, wherein the second stage transmission component (32) comprises a second stage transmission part (321) and a second stage push part (322), the second stage transmission part (321) is slidably disposed on the unlocking drive component (21), the second stage push part (322) is disposed on the second stage transmission part (321), and the second stage push part (322) abuts against the first stage push part (312).

* * * * *